J. W. MOTT.
HEADLIGHT TURNING MECHANISM FOR VEHICLES.
APPLICATION FILED MAY 24, 1915.
1,158,071.
Patented Oct. 26, 1915.
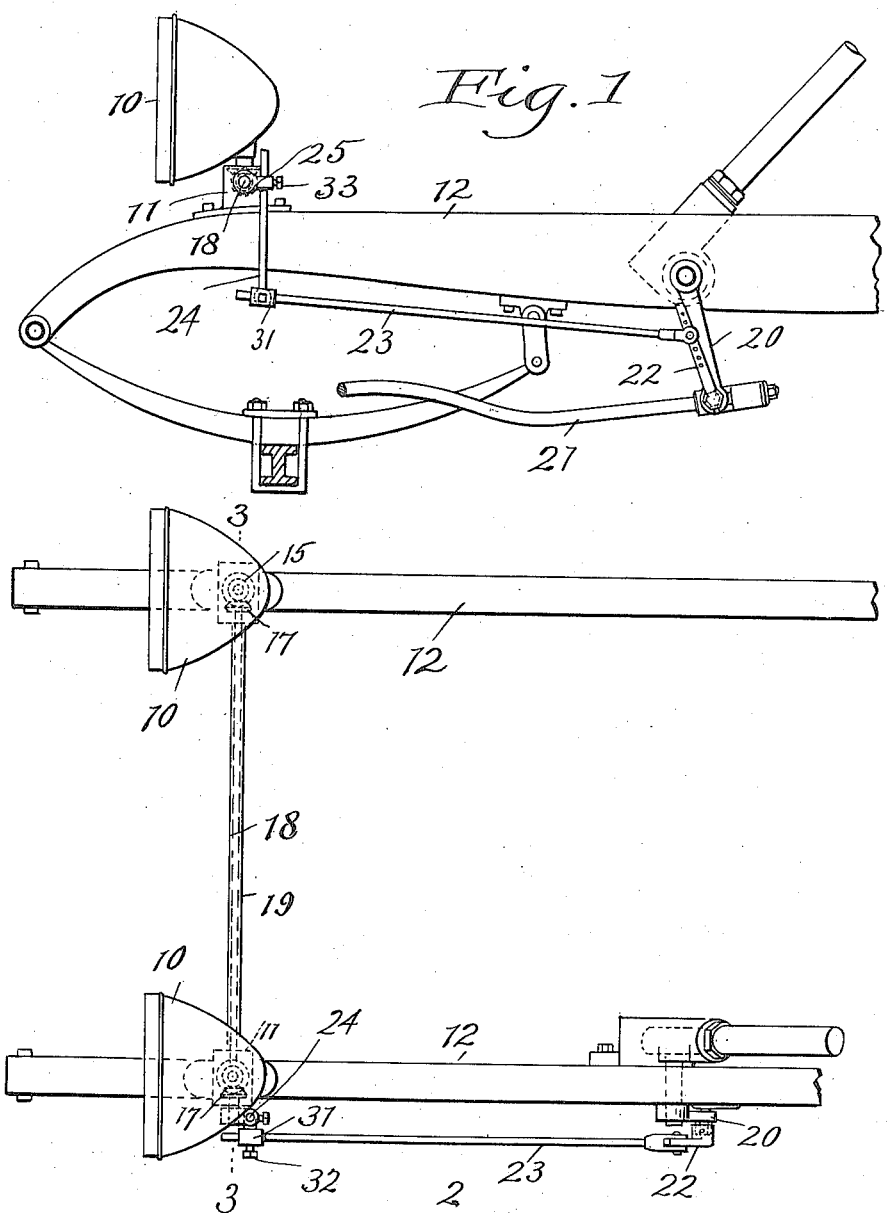

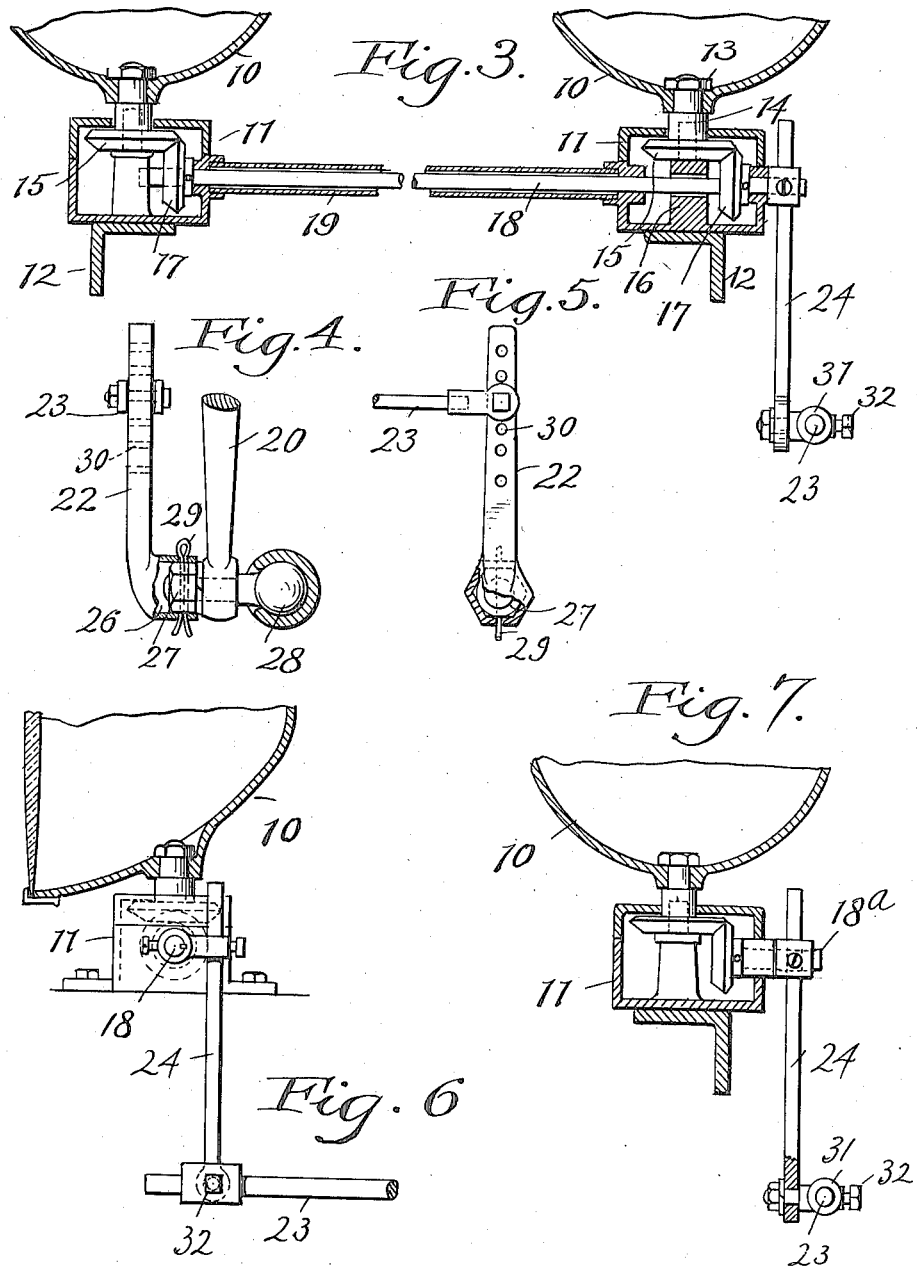

UNITED STATES PATENT OFFICE.

JAMES W. MOTT, OF CRESCO, IOWA, ASSIGNOR OF ONE-THIRD TO ALBERT CHRISTEN AND CLARENCE CHRISTEN, BOTH OF DECORAH, IOWA.

HEADLIGHT-TURNING MECHANISM FOR VEHICLES.

1,158,071.  Specification of Letters Patent.  Patented Oct. 26, 1915.

Application filed May 24, 1915. Serial No. 29,969.

*To all whom it may concern:*

Be it known that I, JAMES W. MOTT, a citizen of the United States, residing at Cresco, in the county of Howard and State of Iowa, have invented a certain new and useful Improvement in Headlight-Turning Mechanism for Vehicles, of which the following is a full, clear, and exact description.

This invention relates to headlight turning mechanism for vehicles, such as automobiles, adapted to cause the headlight or headlights to turn with the steering wheels, so that the light from the lamp or lamps will be cast in the direction in which the vehicle is turning.

Heretofore, various headlight turning mechanisms have been proposed, but so far as I am aware none have been adopted,—at least not to any material extent,—due largely to the fact that the proposed turning mechanisms and the lamp supports were not efficient and durable, and detracted from the appearance of the car.

The object of the present invention is to provide lamp-turning mechanism which is efficient and durable in construction, and not at all unsightly on the car, and to provide in conjunction with this mechanism lamp mountings or supports which are able to successfully withstand jars and shocks, and will not cause the lamps to become loose from vibration.

Still further, the invention aims to provide headlight turning mechanism which can be easily applied to a car without changing anything but the lamp supports, and without weakening the steering gear or interfering in the least with the operation of the latter.

The invention resides particularly in the lamp-supporting means, including a dust-tight inclosure for certain parts of the turning mechanism; it resides also in certain features of adjustment in the parts connecting the steering gear to the lamp-supporting and turning means within the inclosures; and, still further, the invention resides in the manner of connecting the turning mechanism to the steering gear.

My invention may be further briefly summarized as consisting in certain novel details of construction and combinations and arrangements of parts which will be described in the specification and set forth in the appended claims.

Although my invention may be embodied in numerous specifically different forms, in the drawings I have shown one embodiment which answers the requirements with high efficiency, and in the drawings—

Figure 1 is a side elevation of the front part of the chassis of an automobile equipped with my invention, with certain parts of the chassis omitted; Fig. 2 is a top plan view of the same; Fig. 3 is a horizontal sectional view, on an enlarged scale, substantially along the line 3—3 of Fig. 2; Figs. 4 and 5 are detail views illustrating particularly the manner in which the rear part of the turning mechanism is connected to the steering arm or lever; Fig. 6 is a side view, looking toward the left of Fig. 3, with the lamp in section; and Fig. 7 is a sectional view, the plane of which is the same as the sectional plane of Fig. 3, but showing a construction adapted to turn only one of the headlights.

My invention may be utilized in connection with a single headlight, or with both of them, but I shall first describe the construction which is adapted to turn both lamps simultaneously, this construction being illustrated in Figs. 1 to 6, to which reference will first be had. In these figures 10—10 represent the two headlights, which may be of the usual construction, but instead of being mounted upon the fixed lamp brackets are supported on short vertical rotary studs projecting through the top of dust-tight boxes or inclosures 11, which are securely fastened to the front part of the vehicle and preferably to the front portions of the side frame members 12 of the chassis, as shown. These boxes or casings 11, which are preferably formed of stamped metal, inclose gears preferably in the form of bevel gears, constituting a part of the turning mechanism.

Referring particularly to Fig. 3, it will be seen that each lamp is secured by a nut 13 on the upper end of a short stud 14, which projects through one of the casings 11, as before stated, and which is integral with, or fixed to, a horizontally disposed bevel gear 15, which is just below the top or cover of the inclosure 11 and is rotatably supported on a boss or other suitable support 16, projecting upwardly from the base or bottom of the inclosure the said support 16 having a stud shown by dotted lines in Figs. 3 and 7, which stud is received in a vertical socket provided in the gear 15 and in the stud 14 projecting upwardly therefrom. This bevel gear 15 meshes with another bevel gear 17 at right angles to it, and fixed to a horizontally disposed shaft 18. In the event the turning mechanism is used in connection with a single lamp, this shaft will extend simply into the casing and not through the same, but in the event the turning mechanism is used to simultaneously turn both lamps, this shaft will extend through both walls of one of the inclosures 11 and will extend across the front of the machine into the opposite inclosure, it being understood that these two boxes or casings are substantially similar, and that each incloses a duplicate or similar pair of bevel gears, including the two gears 17 which are fixed to the shaft. For the purpose of protecting this horizontal shaft 18 from being easily bent or broken, it preferably passes through a long sleeve 19, which extends between the two boxes or casings 11 and is secured to the adjacent side walls of the latter substantially in the manner illustrated in Fig. 3. This shaft 18 is connected to the steering gear so that the lamps will turn synchronously with, and proportionately to, the movements of the steering wheels, and preferably, this shaft is connected to the so-called steering arm 20 to which is attached the usual steering rod 21, which in turn is connected to one of the steering knuckles in the well-known manner.

In the particular embodiment of my invention here shown, the mechanism for connecting the steering gear to the shaft 18 includes an arm 22 which is attached to the lower end of the steering arm 20 and extends upwardly from the lower end thereof; it includes also a forwardly extending link or rod 23, which at its rear end is adjustably secured to the arm or lever 22, an upright link or rod 24 which at its lower end is adjustably secured to the forward portion of the link or rod 23, and a crank arm 25 which is secured to one end of the shaft 18 at the side of one of the boxes 11, and is adjustably secured to the rod 24.

For the purpose of avoiding drilling holes in the steering arm 20, the lower end of the arm 22 is provided with a sleeve-like extension 26, which is fitted onto and secured to the nut 27, which secures the lower end of the steering arm 20 to the usual ball and socket member 28, connecting the steering arm 20 to the steering rod 21. Usually this nut 27 is a hex nut, and, under ordinary circumstances, the sleeve-like portion 26 will be hexagonal in contour and will be of a size such as will fit closely onto the nut 27. To secure the arm 22 in position, the cotter pin which ordinarily fastens the nut 27 is removed, the socketed or recessed part or sleeve 26 of the arm 22 is slipped onto the nut and is fastened in position by a cotter pin such as cotter pin 29, which fastens the parts together. This arm 22 is provided, along its length, with a series of spaced holes or openings 30, at any one of which the rear end of the rod 23 may be secured. These openings are provided, as is evident, for the purpose of varying the throw of the rod 23 for any predetermined movement of the steering gear. In the event that the steering arm 20 is connected to the steering rod 21 by some means not including the nut 27, the arm or lever 22 may be adjustably clamped direct to the steering arm 20. It will be understood, of course, that the arm 22 will always be located such a distance from the steering arm 20 that sufficient clearance will be provided.

For the purpose of adjustably securing the forwardly extending rod 23 to the upwardly extending rod 24, a connection is provided, consisting of a sleeve 31 which may be secured at any point along the rod 23 by a set screw 32, this sleeve being pivotally connected to the lower end of the rod 24.

For the purpose of adjustably securing the upwardly extending rod 24 to the crank 25 on the shaft 18, the rod 24 is passed through an opening at the end of the crank and is adapted to be secured in any position in said opening by a set screw 33. With this mechanism the turning of the steering gear shifts the arm 22, and this movement is transmitted through the rod 23, the rod 24 and crank 25 to the shaft 18 causing the shaft 18 to be turned. This turning or rotary movement of the shaft is transmitted to the headlights and turns the two headlights simultaneously at an amount equal to the turning movement which has been given to the steering wheels, so that the light will be cast in the direction in which the vehicle is about to turn.

In Fig. 7 I have illustrated a construction wherein my invention is applied for the purpose of turning a single headlight. The construction is the same as that first described, except that there is employed, instead of the long shaft 18, a short shaft 18$^a$ which extends only into the box or inclosure 11, above which is supported the lamp to be turned. As the construction is otherwise the same as that first described, and as the prior description and the reference characters heretofore referred to apply to the parts shown in this figure, no further description need be given.

Mention may be made, in conclusion, that the boxes or inclosures 11 will be packed with semi-solid lubricant, which will effectively lubricate the parts which are supported in the inclosures, and render these parts silent in action and easy to operate.

While I have shown the preferred embodiment of my invention, I do not wish to be confined to the exact details shown and described, but aim in my claims to cover all modifications which do not involve a departure from the spirit and scope of my invention.

What I claim as new and desire to secure by Letters Patent, is:—

1. In combination with a vehicle having a steering mechanism, a movable headlight, a housing supported on the front part of the vehicle and provided with an upwardly projecting fixed stud, a bevel gear having a socket receiving said stud and connected to said headlight so as to turn the same, a shaft supported by said housing and having a bevel gear meshing with the first named bevel gear, and mechanism connecting said shaft to the steering mechanism so that the headlight will be turned with the steering mechanism.

2. In combination with a vehicle having a steering gear and a movable headlight, a housing supported on the front part of the vehicle provided with an upwardly projecting fixed stud, a bevel gear having a socket receiving said stud and an extension projecting upwardly through the top of the housing and connected to the lamp, a horizontal shaft journaled in said housing and having a second bevel gear meshing with the first named bevel gear, and means connecting said shaft to said steering mechanism for causing said shaft and headlight to turn with the steering mechanism.

3. In combination with a vehicle having a steering mechanism and a pair of movable headlights, a pair of housings supported on the front part of the vehicle, each housing having a fixed upwardly projecting stud, bevel gears mounted on said studs and having extensions projecting upwardly through the top of the housings and connected to the two headlights, a shaft extending through and journaled in one of the housings beneath the said stud therein and extending into and journaled in the other housing, bevel gears secured to said shaft and meshing with the first named bevel gears, and mechanism connecting said shaft to the steering mechanism so that the headlights will be turned with the steering mechanism.

4. In combination in a vehicle having a chassis, a steering gear and a movable headlight, a vertical rotary support for the headlight, and mechanism for connecting said lamp support to the steering gear, said mechanism comprising a horizontally disposed shaft, gearing connecting the shaft to the rotary lamp support, a crank fixed to said shaft, a rod secured to said crank, a second rod attached to said first named rod, a lever attached to said second named rod and connected to the steering gear.

5. In combination with a vehicle having a chassis, a steering gear, a pair of movable headlights, a pair of housings mounted on the front part of the chassis, vertical members extending upwardly through said housings and supporting the headlights, a shaft extending through one of the housings across the front of the vehicle and into the other housing, gears attached to said lamp supports and located in the two housings, coöperating gears attached to said shaft for rotating the first named gears, and means connecting said shaft to the steering gear whereby said lamps will be turned with the steering gear.

In testimony whereof, I hereunto affix my signature in the presence of two witnesses.

JAMES W. MOTT.

Witnesses:
 E. B. GILCHRIST,
 L. I. PORTER.